Patented Feb. 28, 1933

1,899,310

UNITED STATES PATENT OFFICE

GEORGE B. BURNHAM, OF BERKELEY, CALIFORNIA, ASSIGNOR TO BURNHAM CHEMICAL COMPANY, OF WESTEND, CALIFORNIA, A CORPORATION OF NEVADA

PROCESS OF OBTAINING A DOUBLE SALT FROM A SINGLE SALT

No Drawing. Application filed May 26, 1930. Serial No. 455,976.

This invention relates to a method of recovering double salts from single salts and particularly to recovering sodium carbonate sulphate, a double salt, containing approximately one molecule of sodium carbonate and two molecules of sodium sulphate, from sodium chloride, a single salt.

The double salt, sodium carbonate sulphate, has the general formula of $Na_4(CO_3.SO_4)$ and, apparently, a more exact chemical formula $Na_2CO_3.2Na_2SO_4$. As far as I know this double salt was first described in my Patent No. 1,417,139 dated May 23, 1922, and filed June 30, 1919. With the above formula it would contain about 27.2% sodium carbonate and 72.8% sodium sulphate, but I have found that its composition appears to vary slightly.

I have found that double salts crystalize as very fine crystals upon agitation during rapid crystallization, while single salts, under the same crystallizing conditions, tend to form crystals relatively much coarser. By taking advantage of this fact I am enabled to separate successfully double salts from single salts when a double salt and a single salt crystallize so that a mixture of the crystals results. This characteristic of double salts I attribute at this time to their complicated molecular structure.

The process is also applicable to a solution from which a triple salt and a single salt crystallize substantially together. The complicated triple salts have a tendency to develop as fine crystals compared to the single salt that may be crystallizing from the solution at or about the same time. The single salt from which the separation is to be made should preferably be quite soluble for when it is insoluble or only slightly soluble, there is accordingly only a little of it in solution and, correspondingly, very little of the salt to crystallize. Under this condition, where there is only a little single salt, the crystals of the single salt are usually fine and hence cannot be readily separated mechanically from the fine double salt crystals.

An object of my invention is to provide an economical process of obtaining complex salts in a substantially pure state.

A further object of my invention is to provide a process for obtaining sodium carbonate sulphate substantially free from sodium chloride.

The invention possesses other advantageous features, some of which with the foregoing will be set forth in the following description where I shall outline in full one form of my process, but it is understood that other forms may be used without deviating from the essence of the invention.

I shall preferably describe the process of my invention as applied to the recovery of sodium carbonate sulphate from sodium chloride in Searles Lake brine in California but it is understood that the process is applicable to other salts, to brines from other sources, artificial solutions of double and single salts or solutions which give rise to such salts.

I prefer to use articial evaporation and artificial temperatures, but natural evaporation and natural temperatures can also be used providing the crystallization can take place under the condition of rapid crystallization and agitation.

In a modified form of my process of obtaining sodium carbonate sulphate, described in my Patent No. 1,417,139, Searles Lake brine was slowly evaporated in summer to obtain sodium carbonate sulphate mixed with sodium chloride.

I have found, however, that with rapid evaporation of Searles Lake brine with agitation, sodium carbonate sulphate can be obtained in a condition whereby it can be more easily separated from sodium chloride. By rapidly evaporating the brine within a few hours time and agitating substantially continuously, I am able to produce very fine crystals of sodium carbonate sulphate and relatively coarse crystals of sodium chloride, without having the crystals stuck together, which would otherwise occur when evaporating in a solar pond in summer. The temperature of evaporation must be over 20° C. and preferably over 30° C. to form this double salt.

Evaporation can be carried out quickly by means of the application of artificial heat. It can also be accomplished quickly by natural evaporation when placed in very shallow vats at a depth of about 1 inch and exposed to the heat of the sun's rays during the daytime between April and October. In the latter case, at Searles Lake, the desired amount of evaporation can be accomplished in a few hours under usual weather conditions during the daytime and the temperature maintained above 30° C.

By the terms "rapidly evaporating" and "rapidly crystallizing" I intend to express the thought that these steps are accomplished in a relatively short period of time compared to the periods utilized heretofore. Thus in my Patent 1,417,139 I described the evaporation and crystallization being extended over a summer. This is without my contemplation here where I prefer the evaporation and concentration be effected in a matter of hours, as compared to months, as stated in my Patents 1,417,139 and 1,476,873.

Agitation is effected in artificial evaporation as by the boiling of the solution, or by suitable mechanical stirrers. With natural evaporation in the shallow one inch vat, agitation is accomplished by mechanical stirring.

The crystals of sodium carbonate sulphate produced in this manner are very fine and tend to be held in suspension in the brine while the crystals of sodium chloride are coarse and tend to settle out of the brine quickly. Hence the crystals of sodium carbonate sulphate and sodium chloride can then be separated by settling the sodium chloride and decanting the solution containing the fine sodium carbonate sulphate crystals in suspension. The crystals of the two salts can also be separated continuously by means of a classifier or any other well known means of effecting mechanical separation. A device which I term a "hydroseparator" is one form of convenient mechanical classifier, wherein the brine with the suspended crystals is flowed into a container while the velocity of flow of the brine with the suspended crystals is regulated so that the coarse crystals settle quickly in the container, and the fine crystals are carried away with the fluid or brine stream into another container where they are recovered. This is just one form of classifier but other forms may be used to take advantage of the difference in the settling rates of the crystals, or the difference in their size.

I claim:

1. The process of obtaining sodium carbonate sulphate from Searles Lake brine which comprises rapidly evaporating the brine and agitating the brine to crystallize sodium carbonate sulphate and sodium chloride, and separating the sodium chloride from the sodium carbonate sulphate.

2. The process of obtaining sodium carbonate sulphate from Searles Lake brine which comprises rapidly evaporating the brine and agitating the brine to crystallize sodium carbonate sulphate and sodium chloride, and subjecting the crystallized sodium carbonate sulphate and sodium chloride, to fluid action whereby sodium chloride crystals settle out of the fluid and the sodium carbonate sulphate crystals are carried away by the fluid stream, and recovering the sodium carbonate sulphate.

3. The process of obtaining sodium carbonate sulphate from Searles Lake brine which comprises rapidly evaporating the brine and agitating the brine to crystallize sodium carbonate sulphate and sodium chloride, and flowing the brine and suspended crystals to separate rapidly settling sodium chloride crystals from slow settling sodium carbonate sulphate crystals.

4. The process of obtaining sodium carbonate sulphate from Searles Lake brine which comprises rapidly evaporating the brine and agitating the brine to crystallize sodium carbonate sulphate and sodium chloride separately in a state of mechanical suspension in the brine, reducing the amount of agitation sufficiently to allow the sodium chloride to settle, removing the brine and the suspended sodium carbonate sulphate, and recovering the suspended sodium carbonate sulphate.

5. The process of obtaining sodium carbonate sulphate from a concentrated solution containing sodium, carbonate, sulphate and chloride ions, which comprises rapidly evaporating and agitating the solution above approximately 30° C. to deposit sodium chloride and sodium carbonate sulphate, and mechanically separating the crystals of sodium carbonate sulphate from the crystals of sodium chloride.

6. The process of obtaining sodium carbonate sulphate from a solution containing the same and another salt comprising evaporating the solution rapidly with agitation to crystallize sodium carbonate sulphate and the other salt, and mechanically separating the crystals of sodium carbonate sulphate from the other salt.

7. The process of obtaining the salts, sodium carbonate sulphate and sodium chloride, from an aqueous solution containing the same and sodium chloride, which consists in agitating the brine while crystallizing these salts to create fine crystals of sodium carbonate sulphate and coarse crystals of sodium chloride, and mechanically separating the fine sodium carbonate sulphate crystals from the coarse sodium chloride crystals.

8. The process of obtaining the salts, sodium carbonate sulphate and sodium chloride, from an aqueous solution containing the same and sodium chloride, which consists in agitating the brine while crystallizing these salts to create fine crystals of sodium carbonate sulphate and coarse crystals of sodium chloride, and flowing the brine and suspended crystals to classify the crystals according to size whereby the sodium carbonate sulphate is recovered substantially separate from the sodium chloride.

9. The process of obtaining sodium carbonate sulphate from a solution containing the same and another salt that will form crystals relatively larger than sodium carbonate sulphate upon evaporation and agitation, which comprises evaporating and agitating the solution to crystallize the two salts, and mechanically separating the fine sodium carbonate sulphate from the coarse crystals of the other salt.

10. The process of obtaining sodium carbonate sulphate from a solution containing the same and another salt that will form crystals relatively larger than sodium carbonate sulphate upon rapid crystallization from solution which comprises rapidly crystalizing the salts from solution to produce fine crystals of sodium carbonate sulphate and coarse crystals of the other salt, and mechanically separating the fine crystals from the coarse crystals.

11. That step in the process of recovering sodium carbonate sulphate separate from other salts which comprises rapidly evaporating with agitation to crystallize fine crystals of sodium carbonate sulphate, and mechanically recovering the sodium carbonate sulphate in substantially a pure state.

In testimony whereof, I have hereunto set my hand.

GEORGE B. BURNHAM.